Patented Aug. 27, 1940

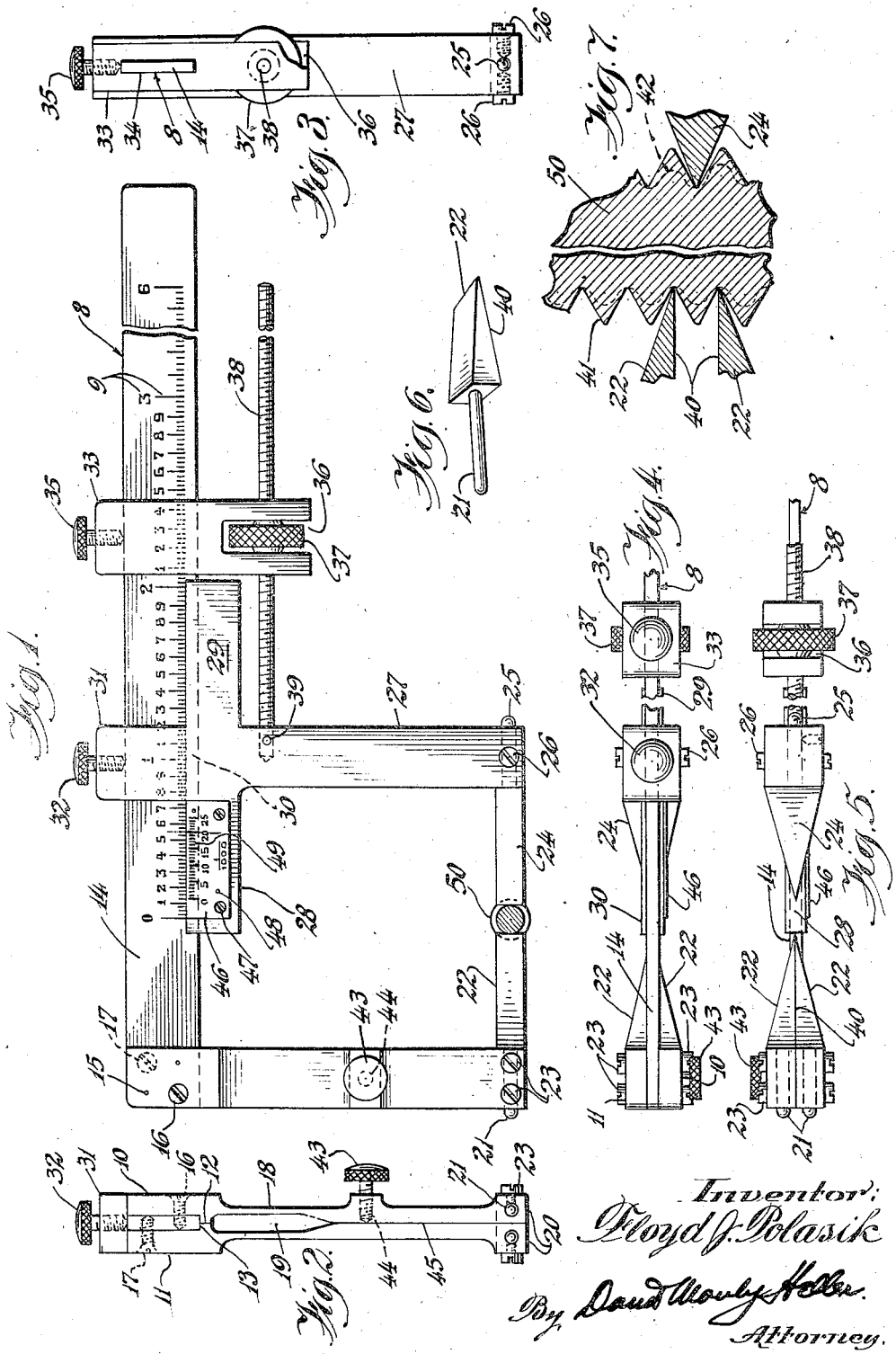

2,212,884

UNITED STATES PATENT OFFICE 2,212,884

VERNIER

Floyd J. Polasik, Chicago, Ill., assignor of one-half to Otto Reitz, Chicago, Ill.

Application August 24, 1939, Serial No. 291,653

7 Claims. (Cl. 33—143)

This invention relates to an improvement in the construction of vernier calipers, the primary object of the invention being to provide an attachment whereby the root diameters of threads may be measured and read directly on the calibration of a vernier.

My invention may be furnished also in the form of an attachment for micrometers.

It has been the custom, and standard practice of measuring the outside of threads, using a standard micrometer or vernier caliper, and from the readings taken the root diameters of threads interpolated, or calculated. It is my desire to provide a device or an improvement to such micrometer or vernier calipers, which will provide a direct reading and thus eliminate all calculation necessary, the direct reading showing the exact dimension of the root diameter of a thread.

Another object of the invention is the provision of such a device which has one fixed jaw, and two relatively adjustable jaws, in order to separate and adjust the same to the pitch of the helix of a screw thread permitting measurement of such threads as standard "V" threads, Acme threads, Whitworth threads, and any thread falling within the above category and within the range and size of the respective instruments that are used for the purpose.

Another object of the invention is the provision of a practical, durable, accurate, efficient, and useful instrument for the purpose to be described, and an instrument of such construction which is economical to manufacture in quantity production.

Other features, objects, and advantages of my invention will become apparent by reference to the accompanying drawing and the ensuing description wherein like symbols will be used to designate like parts and in which;

Fig. 1 shows a front plane view of my improved vernier calipers.

Fig. 2 shows a left end view thereof.

Fig. 3 shows a right end view thereof.

Fig. 4 shows a top view looking down on Figure 1.

Fig. 5 shows a bottom view looking in an upward direction at Figure 1.

Fig. 6 is an isometric view showing one of the important elements comprising my invention.

Fig. 7 is a fragmentary view of a threaded portion showing the jaws comprising the important features of my invention set to measure the root diameter of the thread.

Referring once again to Figure 1, it will be noted that the instrument is generally designated by the numeral 9, comprising a long bar structure designated by the numeral 14, which is calibrated in inches, each inch being divided into ten divisions, and each tenth division being further subdivided into four divisions, thus one division measuring twenty-five thousandths of an inch.

To this bar member 14, are attached two jaw members designated, respectively, 10 and 11, which are held in place and located by the lower edge of the bar 14 and the dowel pins designated by the numeral 15; the jaw 11 being held in place by the screw 17 whereas the jaw 10 is held firmly in place by the screw 16.

The jaws are recessed as indicated at 13, and adapted to be held, normally, together at the common portion designated by the numeral 12. Portions 19 and 18 are undercut on the respective jaw members, to provide a thinner portion which will furnish flexibility for purposes later to be described.

The jaws contact one another firmly on the surface designated by the numeral 45, and one of the jaw members designated by the numeral 10 is provided with a boss portion to receive the knurled adjusting screw designated by the numeral 43, which has a spherical bottom portion designated by the numeral 44 so that it will have an equalizing action when the said screw is threaded inwardly into the boss portion in order to separate the portions 20 of the jaws 10 and 11 respectively.

The jaws 20 are normally in the position indicated in the view in Figure 2. Within these jaws are mounted two wedge shaped toothed members designated respectively by the numeral 22, and having a common flat contacting surface designated by the numeral 40.

It is to be noted that the included angle between the two jaws in assembly and the single jaw 24 on the opposite side is approximately 28 degrees, in order to provide ample clearance for standard thread structure which is 60 degrees, so that there will be no difficulty in getting the jaws to seat themselves firmly in the V shaped recesses of a thread, or the rounded recesses of a Whitworth thread as indicated in Figure 7.

In Figure 7 the wedge members 22 have been separated to a dimension equivalent to the pitch of the V thread being designated by the numeral 41, showing also in dotted lines the Whitworth type of thread indicated by the numeral 42.

The measurement is obtained by directly reading the vernier calipers, the use of such instruments being quite familiar to mechanics accustomed to using such instruments for measuring purposes.

To further explain the operation of my vernier calipers, it will be noted, that the wedge member 24 and the wedge members 22 are secured, respectively, within their holders by virtue of their extensions 25 and 21 respectively, and the screws 26 and 23, respectively. These jaws have knife edges as indicated.

Altho these jaws are made of tool steel, hardened, and ground, to resist wear, yet over a long period of time a slight amount of wear may occur, in which event the adjusting screws 23 and 26 may be utilized in order to compensate for the wear, thus maintaining the accuracy of the instrument at all times.

The vernier caliper is further provided with a standard designated by the numeral 33 which is mounted on the bar member 14 by virtue of a slotted portion designated 34, and is adapted to operate slidably thereover, being held in definite fixed relationship by the knurled screw member designated by the numeral 35 which is used to either permit the member 33 to slide or to remain fixed in one place.

The movable jaw member designated by the numeral 31 is attached to the bar member 14 in slidable manner, and likewise, the adjusting screw 32 is used to bind it in place and secure it in place when a reading is taken. When this screw 32 is released, the jaw 31 is disposed to move with respect to the fixed jaw 33 provided the knurled head clamping screw 35 effects a clamping action of the jaw 33.

The movable jaw 31 is provided with a front guide portion designated by the numeral 28, to which is affixed the vernier measuring device designated by the numeral 46, and which is divided into twenty-five equal parts, spanning a distance equivalent to twenty-four divisions on the bar member 14 heretofore referred to and designated by the numeral 9.

The vernier 46 is attached to the portion 28 by virtue of the screws 47 and the dowels 48 for the reason that it is necessary to have this instrument in accurate relationship and alignment, and if for some reason or other the vernier 46 should have to be removed, setting back in place in accurate location is governed by the dowel pins 48.

The slidable member 31 is further provided with a heel portion designated by the numeral 29, and a U shaped recessed portion designated by the numeral 30 in order to give it perfect bearing and strict alignment.

The fixedly secured jaw 33 is provided with a slotted portion designated by the numeral 36 in order to accommodate the knurled head knob designated by the numeral 37 which rotates upon the screw member 38 for which clearance holes are provided in the jaw 33. Since one end of the threaded portion of the screw 38 is rigidly or swivellably secured to the portion 27 by virtue of a dowel pin 39, and when the jaw member 33 is held fixedly in place by the binding screw 35, then the rotation of the knurled knob 37 by virtue of the thread 38 will cause the jaw 31 to move to the right or left with respect to the jaw 33.

To measure the screw designated by the numeral 50 the edges of the wedge shaped members 24 and 22 must contact the root of the thread as indicated in Figure 1 and Figure 7.

The principle of operation of the vernier which is familiar to the art, is as follows: The vernier caliper consists of a slider with a projecting jaw that can be moved along a graduated bar or scale also provided with a jaw, the instrument being designed to measure accurately the distance between these jaws by means of the scale and by the vernier carried on the slider.

The vernier has $n$ equal parts, spaces or divisions, with aggregate length equal to that of $n+1$ of the smallest division on the scale. Therefore, the length of each vernier division is $$\frac{n \pm 1}{n}, \text{ or } \frac{1 \pm 1}{n}$$

of the smallest scale division that is the vernier division is $$\frac{1}{n}$$

the smallest scale division more or less than such division. This slight difference in the lengths of vernier and scale division, may be called the least count L of the vernier, and enables the determination of fractional parts of division on the fixed scale with precision.

In measuring the length of an object, the jaws of the calipers are brought into light contact with the object, and the scale reading up to the zero point or index of the vernier is observed. When the index does not exactly meet the mark on the scale, the length of the decimal scale division is determined by observing which vernier mark coincides with the mark on the scale. If this coincidence occurs at the $q$th vernier mark, the length of the fractional scale division is evidently $qL$, and this amount is to be added to the direct scale reading.

In other words in this drawing it is depicted that the divisions are one fortieth of an inch or twenty-five thousandths. In this instance the vernier is divided into 25 divisions which span 24 divisions on the scale, hence each vernier is equivalent to one twenty-fifth of one fortieth or .001".

In the illustration, the reading at the index point or cipher indicated on the vernier is one hundred thousandth of an inch plus, whereas the mark on the vernier which coincides exactly with a mark on the scale is 20; hence the reading is .120" . . . of course it will be conceded that a drawing of this kind can not be as accurate as the calibration of an instrument, but has been drawn approximately correct and shows the root diameter of the screw 50 to one hundred twenty thousandths.

In use, my device is actually applied as follows: a specimen which is to be measured such as a screw 50, is placed between the jaws 22 which must first be set in agreement with the dimension representing the pitch of the thread, the thread being placed so that each of the jaws 22 contact the roots of adjoining recesses of any one thread on the one side.

This is accomplished by releasing the clamping screws 35 and 32 in order that the combined jaws 33 and 31 may be free to slide on the bar member 14 until contact is felt between the knife edges of the wedges 24 and 22 respectively. When they are brought into light contact with the screw 50, the binding member 35 may be tightened in order to fixedly set the jaw 33. The knob 37 is then rotated in order to obtain the final contact necessary which experienced mechanics, as a general rule, feel and perceive rather sensitively, and when that contact is obtained, the binding screw 32 may be tightened in order to clamp the jaw 31 fixedly in position.

The screw 50 may be removed, and the vernier in locked position may be taken to a convenient place for reading inspection or examination, especially if the specimen to be measured is in an obscure place in a machine or other mechanical device.

I believe I have described rather succinctly the nature and operation of my invention so that those familiar with the art will have no trouble in using or making the same. I realize that my invention is susceptible of many modifications, alterations, and improvements, and that the drawing herein submitted merely signifies or depicts an exemplary or preferred form, hence I reserve the right to all such modifications, improvements, and alterations, which may come within the scope and spirit of my invention, and the purview of the foregoing description; my invention being limited only by the appended or subjoined claims.

Having thus disclosed and revealed my invention what I claim as new and desire to secure by Letters Patent is:

1. A measuring device comprising, a scale member, a jaw member fixedly secured at one end of said scale member, a movable jaw member slidably secured to the said scale member, one of said jaw members provided with jaw spreading means comprising, two flexible arm members secured to said jaw member at one of their ends and in superimposed relationship, two wedge shaped members secured to the free ends of the said flexible arm members, a single wedge shaped member secured to the other jaw member, the said flexible arm members extending in the same direction, the wedge portions of the said two wedge shaped members extending in the same direction and toward the wedge on the other jaw, and spreading means secured to one of the said flexible arm members and bearing against a surface of the said other flexible arm member adapted to spread the said flexible arm members.

2. A measuring device comprising, a scale member, a jaw member fixedly secured at one end of said scale member, a movable jaw member slidably secured to the said scale member, one of said jaw members provided with spreading means comprising, two flexible arm members secured to said jaw member at one of their ends and in superimposed relationship, two wedge shaped members secured to the free ends of the said flexible arm members, a single wedge shaped member secured to the other jaw member, the said flexible arm members extending in the same direction, the wedge portions of the said two wedge shaped members extending in the same direction and toward the wedge on the other jaw, the said single wedge shaped member having an included angle at the wedge portion equivalent to, not more than, the sum of the included angles of the wedge portions of the two wedge shaped members secured to the said flexible arm members, and spreading means secured to one of the said flexible arm members and bearing against a surface of the said other flexible arm member adapted to spread the said flexible arm members.

3. A measuring device comprising, a scale member, a jaw member fixedly secured to one end of said scale member, a movable jaw member slidably secured to the said scale member, one of said jaw members provided with jaw spreading means comprising, two flexible arm members secured to said jaw member at one of their ends and in superimposed relationship, two wedge shaped members secured to the free ends of the said flexible arm members, a single wedge shaped member secured to the other jaw member, the said flexible arm members extending in the same direction, the wedge portions of the said two wedge shaped members extending in the same direction and toward the wedge on the other jaw, the said single wedge shaped member having an included angle at the wedge portion equivalent to, not more than, the sum of the included angles of the wedge portions of the wedge shaped members secured to the said flexible arm members, the included angle of the wedge portion of the said single wedge member being less than the angle of a thread to be measured, and spreading means secured to one of the said flexible arm members and bearing against a surface of the said other flexible arm member adapted to spread the said flexible arm members.

4. A measuring device comprising, a fixed jaw and a movable jaw, a wedge shaped member secured to one jaw, the other jaw having two flexible arm members secured thereto, the said flexible arm members anchored at one of their ends in a superimposed relationship, two wedge shaped members secured to the free ends of the said flexible arm members, the said flexible arm members extending in the same direction, the wedge portion of the said two wedge shaped members extending in the same direction and toward the wedge member on the other jaw, and spreading means secured to one of the said flexible arm members and bearing against the surface of the other flexible arm member adapted to spread the two wedge shaped members.

5. A measuring device comprising, a fixed jaw and a movable jaw, a wedge shaped member secured to one jaw, the other jaw having two flexible arm members secured thereto, the said flexible arm members anchored at one of their ends in a superimposed relationship, two wedge shaped members secured to the free ends of the said flexible arm members, the said flexible arm members extending in the same direction, the wedge portions of the said two wedge shaped members extending in the same direction and toward the wedge member of the other jaw, and spreading means comprising, screw means secured to one of said flexible arm members at a point intermediate its ends, the said screw means bearing against the surface of the said other flexible arm member and adapted to contactually effectuate the spreading of the said two flexible arm members.

6. A measuring device comprising, a fixed jaw and a movable jaw, a wedge shaped member secured to one jaw, the other jaw having two flexible arm members secured thereto, the said flexible arm members anchored at one of their ends in a superimposed relationship, and provided with two wedge shaped members secured adjustably to their other ends, the said flexible arm members extending in the same direction, the wedge portions of the said two wedge shaped members extending in the same direction and toward the wedge member on the other jaw, the said wedge member on the one side having an inclined angle on the wedge portion equivalent to, not more than, the sum of the included angles of the wedge portions of the said two wedge members on the opposing side.

7. A measuring device comprising, a fixed jaw and a movable jaw, a wedge shaped member secured to one jaw, the other jaw having two flexible arm members secured thereto, the said flexible arm members anchored at one of their ends in a superimposed relationship, and provided with two wedge shaped members secured adjustably to their other ends, the said flexible arm members extending in the same direction, the wedge portion of the said two wedge members extending in the same direction and toward the wedge member on the other jaw, the said wedge member on the one side having an included angle at the wedge portion equivalent to, not more than, the sum of the included angles of the wedge portions of the said two wedge members of the opposing side, the included angle of the wedge portion of the said single wedge member being less than the angle of a thread to be measured.

FLOYD J. POLASIK.